(12) United States Patent  
Smith et al.

(10) Patent No.: US 6,271,761 B1  
(45) Date of Patent: *Aug. 7, 2001

(54) SENSORY FITTING FOR MONITORING BEARING PERFORMANCE

(75) Inventors: Charles C. Smith; Thomas R. Bernard, both of Baton Rouge, LA (US)

(73) Assignee: Scientific Operating Systems, Inc., Addison, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/091,326
(22) PCT Filed: Dec. 13, 1996
(86) PCT No.: PCT/US96/20503
  § 371 Date: Jul. 15, 1998
  § 102(e) Date: Jul. 15, 1998
(87) PCT Pub. No.: WO97/22095
  PCT Pub. Date: Jun. 19, 1997

Related U.S. Application Data

(63) Continuation-in-part of application No. 08/573,428, filed on Dec. 15, 1995, now Pat. No. 5,691,707.

(51) Int. Cl.[7] .................................................. G08B 21/00
(52) U.S. Cl. ........................... 340/682; 184/108; 340/683
(58) Field of Search ................................. 340/682, 683; 73/593, 658, 660; 184/108, 105.2, 105.3, 6.4; 116/101, 216; 246/169 A; 374/208; 702/127, 130

(56) References Cited

U.S. PATENT DOCUMENTS

| | | | |
|---|---|---|---|
| 3,548,396 | 12/1970 | Roberts | 340/682 X |
| 3,603,280 | 9/1971 | Zahuranec | 116/114.5 |
| 4,340,886 | 7/1982 | Boldt et al. | 340/682 |
| 4,812,826 | 3/1989 | Kaufman et al. | 340/682 |
| 5,350,040 | 9/1994 | Gribble | 340/682 X |
| 5,381,692 | 1/1995 | Winslow et al. | 340/682 X |
| 5,544,073 | 8/1996 | Piety et al. | 364/508 |
| 5,691,707 | * 11/1997 | Smith et al. | 340/682 |

OTHER PUBLICATIONS

Specifications Brochure for "Monolithic Accelerometer with Signal Conditioning", Model No. ADXL50, from Analog Devices—16 pages—undated.

* cited by examiner

Primary Examiner—Thomas Mullen  
(74) Attorney, Agent, or Firm—Sieberth & Patty, L.L.C.

(57) ABSTRACT

Described is a device (10) for monitoring bearing performance in apparatus having an aperture sized and configured to receive a grease fitting. The device includes temperature sensing components (34) or vibration sensing components (36), or both, to enable detection of impending bearing failure, and is adapted to either replace or supplement conventional grease fittings (28). The device is configured so as to cooperate with bearings housings of widely divergent dimensions, and in each case to permit adjustment of the device, including the sensing components thereof, to place it in very close proximity to the bearing.

62 Claims, 3 Drawing Sheets

US 6,271,761 B1

SENSORY FITTING FOR MONITORING BEARING PERFORMANCE

This application in the U.S. national stage of International Application No. PCT/US96/20503 filed Dec. 13, 1996, which is a continuation-in-part of U.S. patent application No. 08/573,428 filed on Dec. 15, 1995, now U.S. Pat. No. 5,691,707.

TECHNICAL FIELD

This invention relates a device for the monitoring of bearing performance in apparatus having one or more apertures sized and configured for grease fittings. As used herein, the term bearings includes, but is not limited to, ball bearings, rotary bearings, and bushings.

BACKGROUND

Conventional bearing housings well known in the mechanical arts have grease ports through which grease or other lubricant may be injected into the housing for reducing friction between the bearing and the shaft rotating within the housing. Typically, these grease ports are threaded apertures designed to receive a threaded grease fitting. The grease fitting is removably insertable into the grease port, and includes an axial bore specially configured to permit grease or other lubricant to be injected through the fitting and into the bearing housing without leakage. Notwithstanding this feature, bearings within such housings are prone to fail over time from excessive wear and heat generated by friction between the bearing and the rotary shaft or other objects in contact with the bearing.

U.S. Pat. No. 3,603,280 to Zahuranec discloses a fitting which works in conjunction with a static pressure line, a temperature sensitive fusible plug, and a pressure sensitive alarm to warn of a component's increased temperature, increased temperature in the bearing housing signifying impending bearing failure. Bearing failure can cause equipment to become inoperable and may be hazardous, depending upon the particular function of the apparatus which includes the bearing. Because of the importance of maintaining functional equipment where ever bearings are employed, the ability to reliably and continuously monitor bearing performance during equipment operation and to forecast bearing failure would constitute a significant contribution to equipment maintenance and safety, especially if such a contribution could be made without otherwise affecting the functionality or design of the apparatus or housing containing the monitored bearing.

SUMMARY OF THE INVENTION

The invention described herein is deemed to constitute such a contribution by providing a device for monitoring bearing performance in apparatus having at least one threaded aperture sized and disposed to connectably receive a grease fitting for providing lubricant to the bearing. The device is configured so as to cooperate with bearing housings of widely divergent dimensions, and in each case to permit adjustment of the device, including the sensing components thereof, to place it in very close proximity to or in direct contact with the bearing. The device comprises a sensing fitting sized, threaded and configured to be threadably received in the aperture. In one embodiment of the invention, the sensing fitting includes both temperature sensing means and vibration sensing means to enable detection of impending bearing failure. Thus, in this embodiment impending bearing failure can be sensed by either or both of two indicators of impending bearing failure—an increase in temperature and an increase in vibration. In another embodiment, the sensing fitting includes temperature sensing means alone, while in yet another embodiment, the sensing fitting includes vibration sensing means alone. All such systems are effective for early detection of the inception of bearing failure. In each case, the sensing fitting is threadably and adjustably extendable into the apparatus housing the bearing to permit control of the proximity of the sensing fitting and the sensing means to the bearing.

In preferred embodiments having a sensing fitting with temperature sensing means, the temperature sensing means further comprises either (i) a thermistor temperature detector, which undergoes a change in resistance in response to a change in temperature within the apparatus, or (ii) a thermocouple sensing element, which undergoes a change in current in response to a change in temperature within the apparatus. Where a thermistor temperature detector is used, it is particularly preferred that the detector be adapted to send a signal to a receiver capable of converting the signal into an audible or visual record of the temperature within the apparatus and/or producing an audible or visual alarm if the temperature reaches a preselected level. When a thermocouple sensing element is used, it is particularly preferred that the element be adapted to send a signal to a receiver capable of converting the signal into an audible or visual record of the temperature within the apparatus and/or producing an audible or visual alarm if the temperature reaches a preselected level. It is also particularly preferred that the temperature sensing means be adapted to constantly send the aforesaid signal, and that the receiver be capable of trending the data produced by conversion of the aforesaid signal to provide trended data regarding temperature levels and impending bearing failure.

In preferred embodiments having a sensing fitting with vibration sensing means, the vibration sensing means further comprises a vibration sensor capable of detecting vibration within an x, y and/or z plane. It is particularly preferred that the sensor be adapted, upon detection of vibration within an x, y and/or z plane, to send a signal to a receiver capable of converting the signal into an audible or visual record of the vibration within the apparatus and/or producing an audible or visual alarm if the vibration reaches a preselected level. It is also particularly preferred that the vibration sensing means be adapted to constantly send the aforesaid signal, and that the receiver be capable of trending the data produced by conversion of the aforesaid signal to provide trended data regarding vibration levels and impending bearing failure.

Preferred embodiments also comprise a sensing fitting which is in addition a grease fitting for providing lubricant to said bearing, the sensing fitting including a grease inlet nipple, a grease path and a closure, which closure remains closed at all times when the internal pressure applied to the closure exceeds the external pressure applied to the closure, the closure thereby preventing lubricant from leaking out from the apparatus and through the nipple. Here, the sensing fitting has an axial bore throughout and is configured on one end opposite the inlet nipple to be threadably yet fixedly inserted into a threaded aperture which is sized and configured to receive a grease fitting. As used herein, "axial" is deemed to mean parallel to the axis of the device, but not necessarily coaxial therewith. The other end of the sensing fitting is configured to function as a grease fitting through which lubricant may be injected into the apparatus via the axial bore. Thus, in this embodiment, the grease fitting is integral to the sensing fitting, and the device may be substituted for a conventional grease fitting to permit monitoring of bearing performance and to enable detection of impending bearing failure, without sacrificing the utility of a conventional grease fitting.

In a particularly preferred embodiment, the sensing fitting is separate from, but employed in conjunction with, a grease fitting. There, the sensing fitting is configured on one end to be detachably yet fixedly inserted into an aperture of the apparatus containing the bearing which is sized and configured to receive a grease fitting. The sensing fitting has an axial bore throughout which is stepped so that the portion of the bore proximate to the other end of the fitting is sized and configured to provide an aperture for the detachable yet fixed attachment of a grease fitting. In this particularly preferred embodiment, the sensing fitting provides an intermediate connection between the grease fitting and the apparatus containing the bearing. The fitting thereby acts as a supplement to a grease fitting to permit monitoring of bearing performance and to enable detection of impending bearing failure, without sacrificing the utility of a grease fitting.

This invention also provides for an improvement in apparatus which comprises a housing having a rotary shaft, at least one bearing in which the shaft is rotated, and at least one aperture sized and disposed to connectably receive a grease fitting for providing lubricant to said housing, the improvement being a sensing fitting as described herein for monitoring bearing performance and to enable detection of impending bearing failure.

In addition, this invention provides for a method of monitoring bearing performance in apparatus having at least one aperture sized and disposed to connectably receive a grease fitting for providing lubricant to said bearing, such method comprising placing in the aperture a sensing fitting as described herein to enable detection of impending bearing failure.

These and other embodiments and features of the invention will become still further apparent from the ensuing description, appended claims and accompanying drawings.

BRIEF DESCRIPTION OF THE DRAWINGS

In each of the above figures, like numerals are used to refer to like parts among the several views.

DETAILED DESCRIPTION OF THE INVENTION

Figure 1:
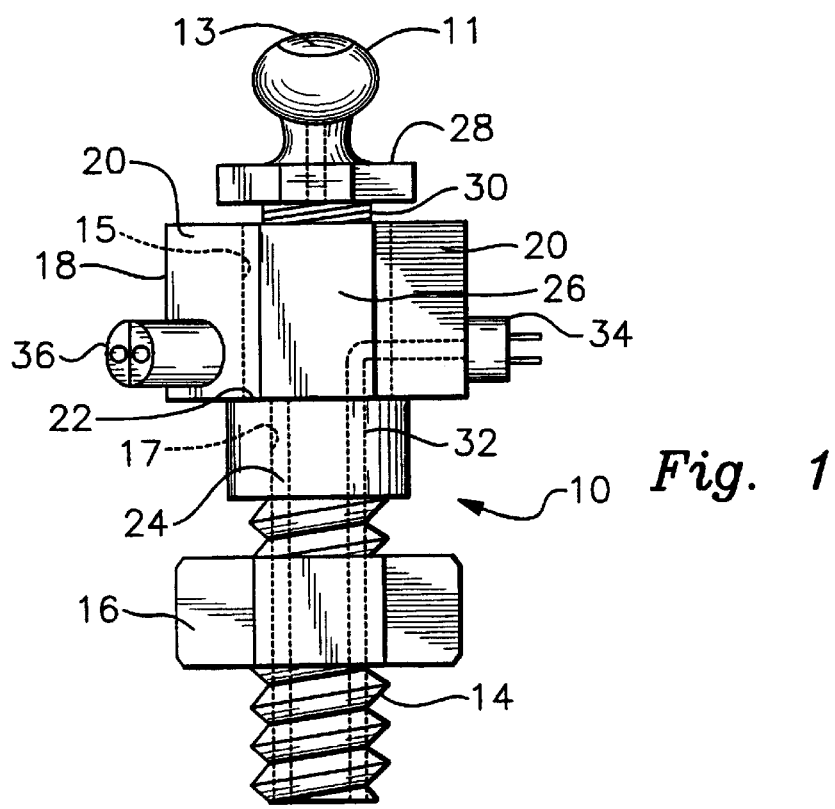
FIG. 1 is a side view of a preferred embodiment of this invention.
Figure 2:
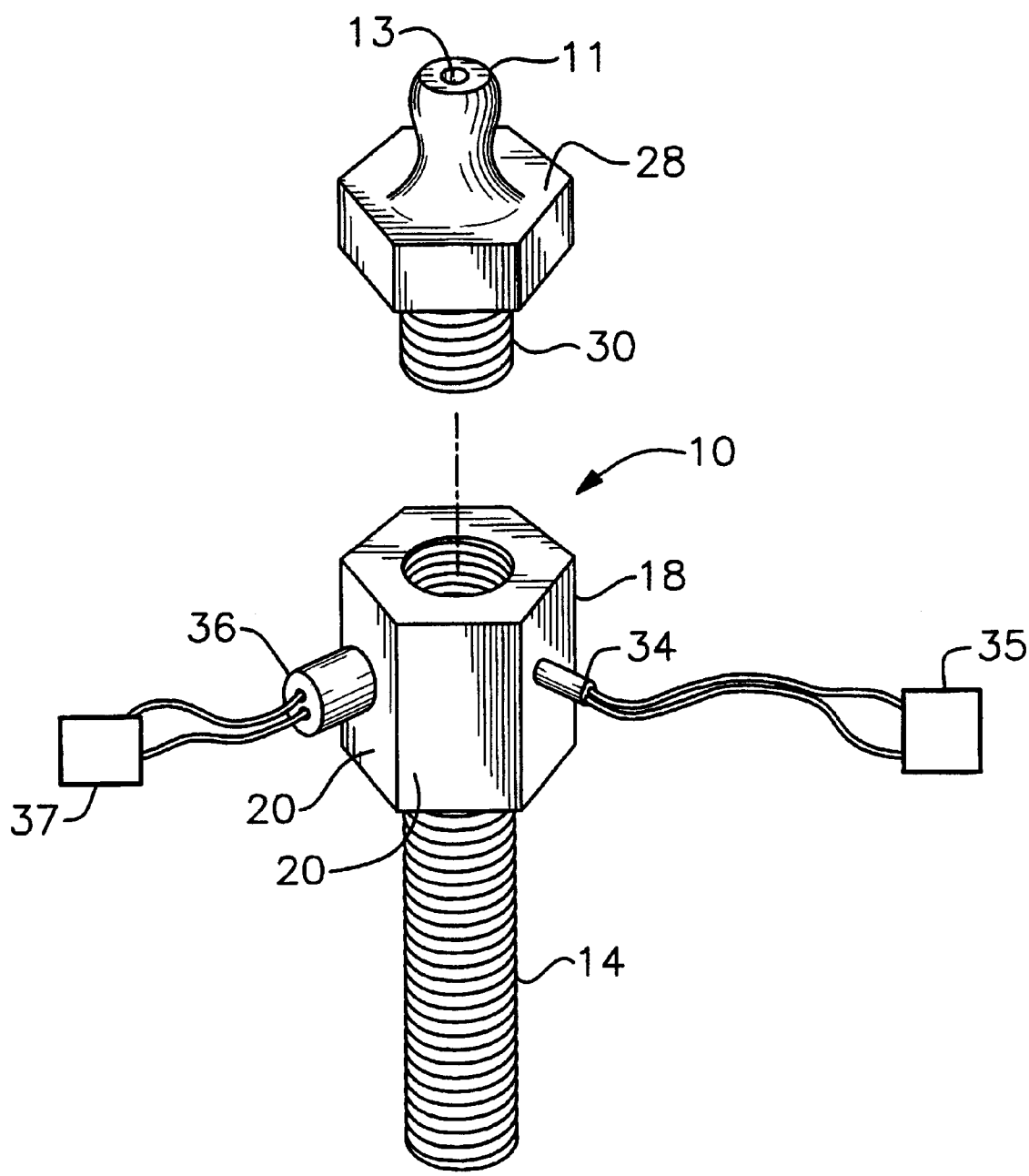
FIG. 2 is a view in perspective of a preferred embodiment of this invention.

As previously noted, this invention provides, among other things, a device for monitoring bearing performance in apparatus having at least one aperture sized and disposed to connectably receive a grease fitting for providing lubricant to the bearing. Referring now to the drawings, FIGS. 1 and 2 depict a preferred embodiment of the invention. Sensing fitting 10 has a connecting end portion 14 with threads configured to meet and cooperate with a threaded aperture for receiving a grease fitting in apparatus containing one or more bearings. The threads of connecting end portion 14 also meet and cooperate with the threads of a lock nut 16, which may be employed to control the depth to which sensing fitting 10 is inserted into the apparatus housing the subject bearing or bearings. Receiving end portion 18 of sensing fitting 10 has a larger diameter than end portion 14, and has an outer surface which includes a plurality of faces 20 to facilitate tightening and loosening of connecting end portion 14 when placed in a threaded aperture.

Sensing fitting 10 has an axial bore along its longitudinal axis which acts as a grease path, the path being defined by circular walls 15 and 17 defining the bore. The grease path includes a step 22, which divides the path into two segments, the first path segment 24 running the length of connecting end portion 14, and the second path segment 26 running the length of receiving end portion 18 and having a larger diameter than first path segment 24 for receiving grease fitting 28. Second segment 26 is threaded to fixably yet detachably receive threaded portion 30 of grease fitting 28.

Sensing fitting 10 also has a second bore, wire path 32, which is offset from the grease path. Wire path 32 runs parallel to the longitudinal axis of sensing fitting 10 for the entire length of connecting end portion 14. Thereafter, wire path 32 turns substantially perpendicular to and away from the grease path at a selected point along receiving end portion 18, ending at an aperture in the wall of receiving end portion 18. Temperature sensing means in the form of either a thermistor or a thermocouple elements 34 is attached to the outer wall of receiving end portion 18 at the aperture formed by wire path 32. Element 34 includes wires which extend through the outer wall of receiving end portion 18 and through the entire length of wire path 32. Preferably, wire path 32 containing the wires of element 34 is sealed with a suitable heat-resistant sealant to prevent grease or other lubricants from traveling through wire path 32 when sensing fitting 10 is installed and the apparatus is operative. The electrical signal generated through element 34 is received by an electronic amplifier receiver 35. (See FIG. 2.)

Alternatively, wire path 32 may run parallel to the longitudinal axis of sensing fitting 10 for the entire length of connecting end portion 14, and thereafter intersect with the grease path at step 22 before turning perpendicular to and away from the grease path and ending at an aperture in the wall of receiving end portion 18. In such case, wire path 32 is preferably insulated with a suitable heat-resistant sealant where the wires contained therein may be exposed to lubricant within the grease path.

Finally, vibration sensor 36 is attached to the outer wall of receiving end portion 18, thereby enabling detection of vibration associated with apparatus when sensing fitting 10 is installed in said aperture. Vibration sensor 36 may be constructed to sense vibration in a number of ways. In a preferred embodiment, vibration sensor 36 is a monolithic accelerometer with signal conditioning. A suitable monolithic accelerometer is commercially available from Analog Devices at One Technology Way, P.O. Box 9106, Norwood Mass. 02062-9106, U.S.A., Model No. ADXL50. The electrical signal generated by sensor 36 is received by an electronic amplifier receiver 37. (See FIG. 2.)

Figure 3:
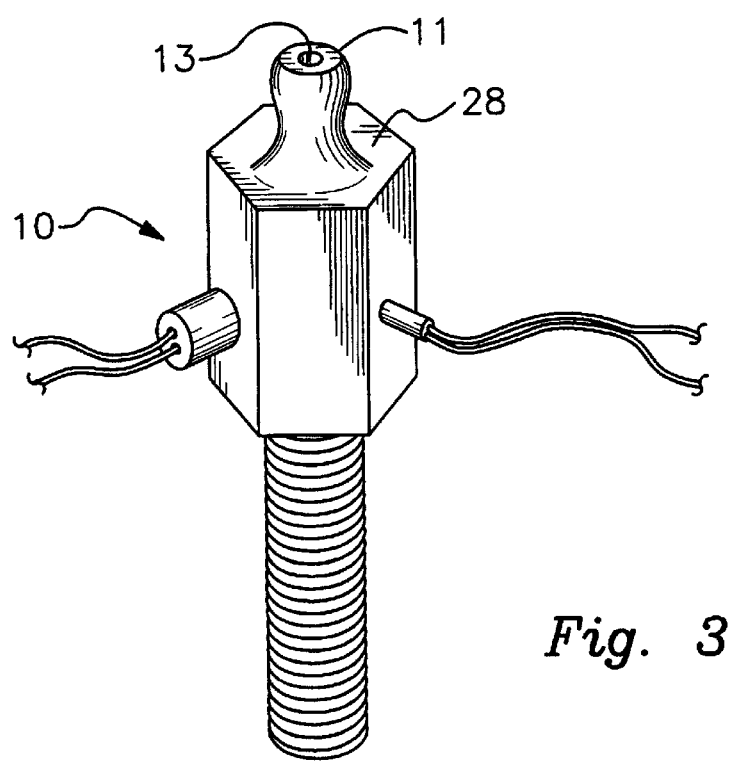
FIG. 3 is a view in perspective of another preferred embodiment of this invention.

It should be understood and appreciated, therefore, that once grease fitting 28 is fixedly yet detachably attached to sensing fitting 10, and sensing fitting 10 is installed in an aperture in the subject apparatus, a grease path is created which extends through both fittings and into the apparatus housing one or more bearings. In another embodiment, sensing fitting 10 may be integral with grease fitting 28 so that the two fittings become one. This embodiment is illustrated in FIG. 3. Thus, in this embodiment, sensing fitting 10 includes a grease inlet nipple 11 providing an opening for the grease path and including a closure preferably in the form of a spring-loaded ball 13 which blocks the grease path to prevent lubricant leakage when the spring pressure applied to the portion of the ball facing the grease path exceeds pressure applied to the opposite, exterior face of the ball. Thus, for example, when a grease gun or other device is used to inject grease into the housing through the nipple, ball 13 will recede to allow injection of grease until the pressure applied to the interior face of ball 13 by the spring exceeds the pressure applied by the grease flowing from the grease gun or similar device into nipple 11. When no grease is being injected, ball 13 remains in place to block the flow of grease out of the housing and fitting through nipple 11. While this configuration is preferred, other closure configurations may achieve similar results and are within the ambit of this invention. It also should be noted that it is not required that connecting end portion 14 be threaded, as long as it is configured to permit fitting 10 to be fixedly yet detachably attached to the relevant apparatus. Likewise, where the two fittings are detachable (i.e., not integral to one another), it is not required that second path segment 26 be threaded, as long as it is configured to permit grease fitting 28 to be fixedly yet detachably attached to fitting 10. In both cases, various other means, including snap-on and clamp mechanisms, may be equally effective. Locking nut 16 is also optional, but is preferred where the sensing fitting's proximity to the monitored bearing is important for increased levels of sensitivity to temperature change. Both lock nut 16 and sensing fitting 10 may be fabricated from any number of heat absorbing, resilient compounds, metals or alloys. Examples include but are not limited to stainless steel, aluminum, cast iron, and brass.

From the description of this preferred embodiment it may now be seen that connecting end portion 14 and lock nut 16 permit adjustment of the extent to which connecting end portion 14 extends into the housing so that the proximity of the fitting to the bearing may be controlled. In so doing, the temperature sensing means is brought in close proximity to or in contact with the bearing or bearings since the sensing means is located at the end of connecting end portion 14. Such control is highly advantageous because greater accuracy in temperature measurement may be achieved since reduced heat conductivity becomes less of a factor when the temperature sensing means is placed in very close proximity to or in direct contact with the subject device. In addition, where the sensing fitting includes vibration sensing means, as the sensing fitting is placed in closer proximity to the source of potential vibration, additional mass of the sensing fitting is placed in closer proximity to the vibration source, and a more accurate measurement of source vibration may be obtained. Preferably, the at least a portion of the sensing fitting (as depicted, connecting end portion 14) will extend into the housing far enough to contact the bearing, or to be in very close proximity to the bearing, preferably a distance in the range of about 0 to about 3 mm from the bearing to maximize the sensitivity of the fitting. It will also be noted that, in the preferred embodiment depicted, connecting end portion 14 has a substantially uniformly cylindrical shape which is externally threaded. This permits for adequate adjustment of the depth of the sensing fitting, when desired, so as to place at least a portion of the sensing fitting, including the relevant sensing means, in close proximity to or in direct contact with the subject bearing or bearings. In addition, pursuant to this invention connecting end portion 14 may be fabricated to have a particular and appropriate length for a given application, depending upon the depth to which the fitting must go to be placed in direct contact with or in very close proximity to the bearing inside the housing.

The diameters for the first path segment 24 and wire path 32 will vary depending upon the particular application, but the sum of their diameters at connecting end portion 14 will always be less than the smallest diameter of the sensing fitting itself. Second path segment 26 will have a diameter which is dependent upon the particular grease fitting employed. More viscous lubricants may require that grease path have a larger diameter than diameter requirements of less viscous lubricants. In any event, the diameters of the grease path must enable, at a minimum, conventional injection of a sufficient volume of lubricant to maintain the required level of lubricant to the bearing. The diameter of wire path 32 in a given application of the fitting should permit insertion of the wires extending from the particular temperature sensing means employed.

It should be further understood that FIGS. 1, 2 and 3 illustrate an embodiment utilizing both a temperature sensor and a vibration detector. Other embodiments of this invention may include either a temperature sensor or a vibration detector without the presence of the other.

As previously stated, it is also particularly preferred that the particular temperature sensing means, vibration sensing means, or both, be adapted to constantly send their respective signal, and that their associated receivers be capable of trending the data produced by conversion of the respective signal to provide trended data regarding temperature and/or vibration levels, as the case may be, as well as impending bearing failure. These receivers may be separate units or a single unit, although they typically will be different receivers in light of the fact that the signals generated by the different sensing means may also be different in type or character. Non-limiting examples of these receivers include thermocouple or current amplifiers, voltage or operational amplifiers, and computers or other electronic circuitry, which in turn are inputs to a horn, light, display, printer, plotter or any other communication device. As illustrated, receivers 35 and 37 are preferably different 741 operational amplifiers. Such amplifiers are widely available as articles of commerce. Such receivers may be adapted to have a trending capability through connection to or integration with a computer, plotter, or other device capable of compiling, and visually displaying data produced over time from conversion of the particular signal involved.

Figure 7:
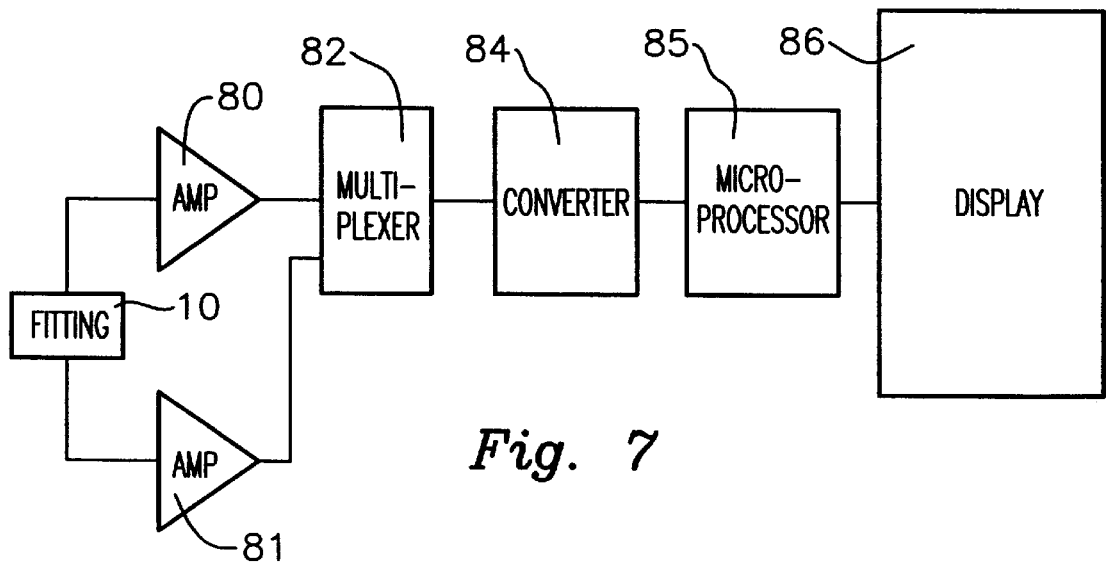
FIG. 7 is a schematic diagram of a preferred adapted receiver of this invention.

FIG. 7 schematically illustrates an adapted receiver of this invention. There it may be seen that changes in temperature and/or vibration are detected by sensing fitting 10, which in turn sends electrical signals to two 741 operational amplifiers 80 and 81, respectively (sold by Analog Devices, among others), which send respective amplified signals to a ADG526ARN multiplexer 82 (sold by Analog Devices, among others). Multiplexer 82, in turn, sends a multiplexed analog signal to a AD574AJN analog/digital converter 84 (sold by Analog Devices, among others), which sends a digital signal to an Intel 5051 microprocessor 85. Processor 85 presents the processed digital signal to a display 86. Display 86 may take the form of a computer screen, printer, plotter, or other visual or audio communication device. Each component in this schematic illustration is commonly available in commerce from a number of different suppliers, and is merely illustrative of a preferred adapted receiver of this invention which should not be construed as limiting the scope of this invention.

Figure 4:
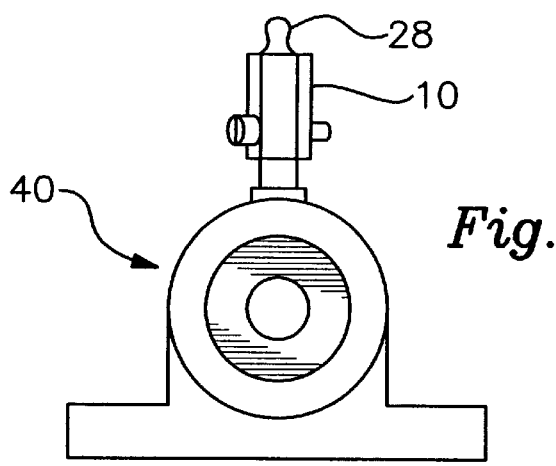
FIG. 4 is a cross section view of a bearing block which includes the device of this invention.
Figure 5:
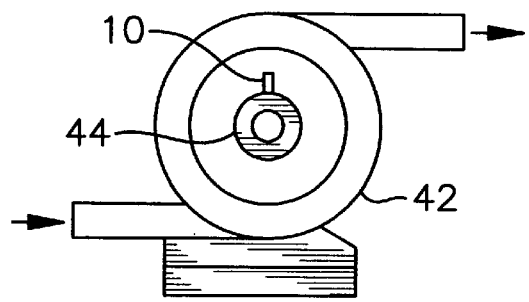
FIG. 5 is a side view of a pump including the device of this invention.
Figure 6:
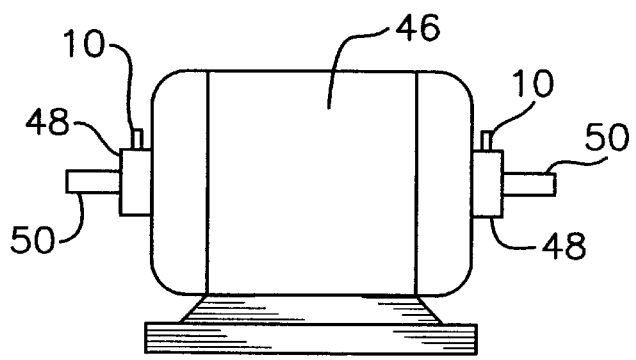
FIG. 6 is a side view of an electric motor including the device of this invention.

FIGS. 4, 5 and 6 illustrate examples of apparatus which may employ the device of this invention. FIG. 4 illustrates a bearing block 40 in cross-section on which fitting 10 is installed and has attached thereto grease fitting 28. FIG. 5 shows a cross-sectional view of pump 42, wherein fitting 10 is installed on bearing housing 44. FIG. 6 shows a side view of an electric motor 46 in which fitting 10 has been installed on two bearing housings 48 for shaft 50.

This invention is susceptible to considerable variation in its practice. Therefore, the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

What is claimed is:

1. A device for monitoring bearing performance in apparatus having at least one threaded aperture sized and disposed to connectably receive a grease fitting for providing lubricant to said bearing, which device comprises a sensing fitting sized, threaded and configured to be threadably received in said aperture, said sensing fitting including a connecting end which defines a grease path and which is sized and configured to be fixedly yet detachably received by said aperture so that, when installed in said aperture, said connecting end is proximate to said bearing, and temperature sensing means to enable detection of impending bearing failure, a portion of said temperature sensing means extending into and along the length of said connecting end.

2. A device according to claim 1 wherein said temperature sensing means comprises a thermistor temperature detector which undergoes a change in resistance in response to a change in temperature within said apparatus.

3. A device according to claim 2 wherein said detector is adapted to send a signal to a receiver capable of converting said signal into an audible or visual record of the temperature within said apparatus and/or producing an audible or visual alarm if the temperature reaches a preselected level.

4. A device according to claim 1 wherein said temperature sensing means comprises a thermocouple sensing element which undergoes a change in current in response to a change in temperature within said apparatus.

5. A device according to claim 4 wherein said element is adapted to send a signal to a receiver capable of converting said signal into an audible or visual record of the temperature within said apparatus and/or producing an audible or visual alarm if the temperature reaches a preselected level.

6. A device according to claim 1 wherein said sensing fitting is in addition a grease fitting for providing lubricant to said bearing, said sensing fitting including a grease inlet nipple, a grease path and a closure, which closure remains closed at all times when the internal pressure applied to said closure exceeds the external pressure applied to said closure, said closure thereby preventing lubricant from leaking out from said apparatus and through said nipple.

7. A device according to claim 1 wherein said sensing fitting further includes a receiving end and wherein said sensing fitting has an axial bore along its longitudinal axis for providing a grease path, the portion of said bore proximate to said receiving end being sized and configured to fixedly yet detachably receive a grease fitting.

8. A device for monitoring bearing performance in apparatus having at least one threaded aperture sized and disposed to connectably receive a grease fitting for providing lubricant to said bearing, which device comprises a sensing fitting sized, threaded and configured to be threadably received in said aperture, said sensing fitting including vibration sensing means to enable detection of impending bearing failure, and said sensing fitting being threadably adjustably extendable into said apparatus to permit control of the proximity of said sensing fitting and said sensing means to said bearing, and wherein said sensing fitting is in addition a grease fitting for providing lubricant to said bearing, said sensing fitting including a grease inlet nipple, a grease path, and a closure, which closure remains closed at all times when the internal pressure applied to said closure exceeds the external pressure applied to said closure, said closure thereby preventing lubricant from leaking out from said apparatus and through said nipple.

9. A device according to claim 8 wherein said vibration sensing means comprise a vibration sensor capable of detecting vibration within an x, y and/or z plane.

10. A device according to claim 9 wherein said sensor is adapted, upon detecting vibration within an x, y and/or z plane, to send a signal to a receiver capable of converting said signal into an audible or visual record of the vibration within said apparatus and/or producing an audible or visual alarm if the vibration reaches a preselected level.

11. A device according to claim 8 wherein said sensing fitting has a connecting end and a receiving end, said connecting end being sized and configured to be fixedly yet detachably received by said aperture, and wherein said sensing fitting has an axial bore along its longitudinal axis for providing a grease path, the portion of said bore proximate to said receiving end being sized and configured to fixedly yet detachably receive a grease fitting.

12. A device according to claim 8 further comprising temperature sensing means to enable detection of impending bearing failure.

13. A device according to claim 12 wherein said sensing fitting has a connecting end and a receiving end, said connecting end being sized and configured to be fixedly yet detachably received by said aperture, and wherein said sensing fitting has an axial bore along its longitudinal axis for providing a grease path, the portion of said bore proximate to said receiving end being sized and configured to fixedly yet detachably receive a grease fitting.

14. A device according to claim 12 wherein said temperature sensing means comprises a thermistor temperature detector which undergoes a change in resistance in response to a change in temperature within said apparatus.

15. A device according to claim 14 wherein said sensing fitting has a connecting end and a receiving end, said connecting end being sized and configured to be fixedly yet detachably received by said aperture, and wherein said sensing fitting has an axial bore along its longitudinal axis for providing a grease path, the portion of said bore proximate to said receiving end being sized and configured to fixedly yet detachably receive a grease fitting.

16. A device according to claim 14 wherein said detector is adapted to send a signal to a receiver capable of converting said signal into an audible or visual record of the temperature within said apparatus and/or producing an audible or visual alarm if the temperature reaches a preselected level.

17. A device according to claim 14 wherein said vibration sensing means comprises a vibration sensor capable of detecting vibration within an x, y and/or z plane.

18. A device according to claim 17, wherein said sensor is adapted, upon detecting vibration within an x, y and/or z plane, to send a signal to a sensor signal receiver capable of converting said signal into an audible or visual record of the vibration within said apparatus and/or producing an audible or visual alarm if the vibration reaches a preselected level.

19. A device according to claim 18, wherein said detector is adapted to send a signal to a detector signal receiver capable of converting said signal into an audible or visual record of the temperature within said apparatus and/or producing an audible or visual alarm if the temperature reaches a preselected level.

20. A device according to claim 19 wherein said detector and said sensor are adapted to constantly send their respective signal, and said respective receivers are adapted to also trend data produced from conversion of the respective signals.

21. A device according to claim 19 wherein said sensing fitting has a connecting end and a receiving end, said connecting end being sized and configured to be fixedly yet detachably received by said aperture, and wherein said sensing fitting has an axial bore along its longitudinal axis for providing a grease path, the portion of said bore proximate to said receiving end being sized and configured to fixedly yet detachably receive a grease fitting.

22. A device according to claim 12 wherein said temperature sensing means comprises a thermocouple sensing element which undergoes a change in current in response to a change in temperature within said apparatus.

23. A device according to claim 22 wherein said element is adapted to send a signal to a receiver capable of converting said signal into an audible or visual record of the temperature within said apparatus and/or producing an audible or visual alarm if the temperature reaches a preselected level.

24. A device according to claim 23 wherein said vibration sensing means comprises a vibration sensor capable of detecting vibration within an x, y and/or z plane.

25. A device according to claim 24, wherein said sensor is adapted, upon detecting vibration within an x, y and/or z plane, to send a signal to a receiver capable of converting said signal into an audible or visual record of the vibration within said apparatus and/or producing an audible or visual alarm if the vibration reaches a preselected level.

26. A device according to claim 25 wherein said element and said sensor are adapted to constantly send their respective signal, and said respective receivers are adapted to also trend data produced from conversion of the respective signals.

27. A device according to claim 25 wherein said sensing fitting has a connecting end and a receiving end, said connecting end being sized and configured to be fixedly yet detachably received by said aperture, and wherein said sensing fitting has an axial bore along its longitudinal axis for providing a grease path, the portion of said bore proximate to said receiving end being sized and configured to fixedly yet detachably receive a grease fitting.

28. A device according to claim 12 wherein said vibration sensing means comprises a vibration sensor capable of detecting vibration within an x, y and/or z plane.

29. A device according to claim 28, wherein said sensor is adapted, upon detecting vibration within an x, y and/or z plane, to send a signal to a receiver capable of converting said signal into an audible or visual record of the vibration within said apparatus and/or producing an audible or visual alarm if the vibration reaches a preselected level.

30. A device according to claim 29 wherein said sensing fitting has a connecting end and a receiving end, said connecting end being sized and configured to be fixedly yet detachably received by said aperture, and wherein said sensing fitting has an axial bore along its longitudinal axis for providing a grease path, the portion of said bore proximate to said receiving end being sized and configured to fixedly yet detachably receive a grease fitting.

31. The device according to any of claims 20, 21, 26, or 27 taken individually, wherein, when said device is installed, the distance between a portion of said sensing fitting and said bearing is in the range of about 0 to about 3 mm.

32. The device according to any of claims 7, 11, 13, 21 or 27 taken individually, wherein said connecting end is substantially uniformly cylindrical and is externally threaded.

33. In apparatus which comprises a housing having a rotary shaft, at least one bearing in which said shaft is rotated, and at least one threaded aperture sized and disposed to connectably receive a grease fitting for providing lubricant to said housing, the improvement wherein a sensing fitting sized, threaded and configured to be threadably received in said aperture is threadably received in said aperture, said sensing fitting including a connecting end which defines a grease path and which is sized and congifured to be fixedly yet detachably received by said aperture so that, when installed in said aperture, said connecting end is proximate to said bearing, and temperture sensing means to enable detection of impleding bearing failure, a portion of said temperture sensing meanst extending into and along the length of said connecting end.

34. Apparatus according to claim 33 wherein said temperature sensing means comprises a thermistor temperature detector which undergoes a change in resistance in response to a change in temperature within said housing and is adapted to send a signal to a receiver capable of converting said signal into an audible or visual record of the temperature within said housing and/or producing an audible or visual alarm if the temperature reaches a preselected level, and wherein said sensing fitting is in addition a grease fitting for providing lubricant to said bearing, said sensing fitting including a grease inlet nipple, a grease path and a closure, which closure remains closed at all times when the internal pressure applied to said closure exceeds the external pressure applied to said closure, said closure thereby preventing lubricant from leaking out from said apparatus and through said nipple.

35. Apparatus according to claim 33 wherein said temperature sensing means comprises a thermistor temperature detector which undergoes a change in resistance in response to a change in temperature within said housing and is adapted to send a signal to a receiver capable of converting said signal into an audible or visual record of the temperature within said housing and/or producing an audible or visual alarm if the temperature reaches a preselected level, and wherein said sensing fitting further includes a receiving end, and wherein said sensing fitting has an axial bore along its longitudinal axis for providing a grease path, the portion of said bore proximate to said receiving end being sized and configured to fixedly yet detachably receive a grease fitting.

36. Apparatus according to claim 33 wherein said temperature sensing means comprises a thermocouple sensing element which undergoes a change in current in response to a change in temperature within said housing and is adapted to send a signal to a receiver capable of converting said signal into an audible or visual record of the temperature within said housing and/or producing an audible or visual alarm if the temperature reaches a preselected level, and wherein said sensing fitting is in addition a grease fitting for providing lubricant to said bearing, said sensing fitting including a grease inlet nipple, a grease path and a closure, which closure remains closed at all times when the internal pressure applied to said closure exceeds the external pressure applied to said closure, said closure thereby preventing lubricant from leaking out from said apparatus and through said nipple.

37. Apparatus according to claim 33 wherein said temperature sensing means comprises a thermocouple sensing element which undergoes a change in current in response to a change in temperature within said housing and is adapted to send a signal to a receiver capable of converting said signal into an audible or visual record of the temperature within said housing and/or producing an audible or visual alarm if the temperature reaches a preselected level, and wherein said sensing fitting further includes a receiving end, and wherein said sensing fitting has an axial bore along its longitudinal axis for providing a grease path, the portion of said bore proximate to said receiving end being sized and configured to fixedly yet detachably receive a grease fitting.

38. In apparatus which comprises a housing having a rotary shaft, at least one bearing in which said shaft is rotated, and at least one threaded aperture sized and disposed to connectably receive a grease fitting for providing lubricant to said housing, the improvement wherein a sensing fitting sized, threaded and configured to be threadably received in said aperture is threadably received in said aperture, said sensing fitting including vibration sensing means to enable detection of impending bearing failure, and said sensing fitting being threadably adjustably extendable into said apparatus to permit control of the proximity of said sensing fitting and said sensing means to said bearing, and wherein said sensing fitting is in addition a grease fitting for providing lubricant to said bearing, said sensing fitting including a grease inlet nipple, a grease path and a closure, which closure remains closed at all times when the internal pressure applied to said closure exceeds the external pressure applied to said closure, said closure, thereby preventing lubricant from leaking out from said apparatus and through said nipple.

39. Apparatus according to claim 38 wherein said vibration sensing means comprises a vibration sensor capable of detecting vibration within an x, y and/or z plane and adapted, upon detecting such vibration, to send a signal to a receiver capable of converting said signal into an audible or visual record of the vibration within said housing and/or producing an audible or visual alarm if the vibration reaches a preselected level.

40. Apparatus according to claim 38 wherein said vibration sensing means comprises a vibration sensor capable of detecting vibration within an x, y and/or z plane and adapted, upon detecting such vibration, to send a signal to a receiver capable of converting said signal into an audible or visual record of the vibration within said housing and/or producing an audible or visual alarm if the vibration reaches a preselected level, and wherein said sensing fitting has a connecting end and a receiving end, said connecting end being sized and configured to be fixedly yet detachably received by said aperture.

41. Apparatus according to claim 38 wherein said sensing fitting also includes temperature sensing means to enable detection of impending bearing failure.

42. Apparatus according to claim 41 wherein said temperature sensing means comprises a thermistor temperature detector which undergoes a change in resistance in response to a change in temperature within said housing and is adapted to send a signal to a receiver capable of converting said signal into an audible or visual record of the temperature within said housing and/or producing an audible or visual alarm if the temperature reaches a preselected level.

43. Apparatus according to claim 42 wherein said vibration sensing means comprises a vibration sensor capable of detecting vibration within an x, y and/or z plane and adapted, upon detecting such vibration, to send a signal to a receiver capable of converting said signal into an audible or visual record of the vibration within said housing and/or producing an audible or visual alarm if the vibration reaches a preselected level.

44. Apparatus according to claim 42 wherein said vibration sensing means comprises a vibration sensor capable of detecting vibration within an x, y and/or z plane and adapted, upon detecting such vibration, to send a signal to a receiver capable of converting said signal into an audible or visual record of the vibration within said housing and/or producing an audible or visual alarm if the vibration reaches a preselected level, and wherein said sensing fitting has a connecting end and a receiving end, said connecting end being sized and configured to be fixedly yet detachably received by said aperture.

45. Apparatus according to claim 41 wherein said temperature sensing means comprises a thermocouple sensing element which undergoes a change in current in response to a change in temperature within said housing and is adapted to send a signal to a receiver capable of converting said signal into an audible or visual record of the temperature within said housing and/or producing an audible or visual alarm if the temperature reaches a preselected level.

46. Apparatus according to claim 45 wherein said vibration sensing means comprises a vibration sensor capable of detecting vibration within an x, y and/or z plane and adapted, upon detecting such vibration, to send a signal to a receiver capable of converting said signal into an audible or visual record of the vibration within said housing and/or producing an audible or visual alarm if the vibration reaches a preselected level.

47. Apparatus according to claim 45 wherein said vibration sensing means comprises a vibration sensor capable of detecting vibration within an x, y and/or z plane and adapted, upon detecting such vibration, to send a signal to a receiver capable of converting said signal into an audible or visual record of the vibration within said housing and/or producing an audible or visual alarm if the vibration reaches a preselected level, and wherein said sensing fitting has a connecting end and a receiving end, said connecting end being sized and configured to be fixedly yet detachably received by said aperture.

48. Apparatus according to claim 41 wherein said vibration sensing means comprises a vibration sensor capable of detecting vibration within an x, y and/or z plane and adapted, upon detecting such vibration, to send a signal to a receiver capable of converting said signal into an audible or visual record of the vibration within said housing and/or producing an audible or visual alarm if the vibration reaches a preselected level.

49. Apparatus according to claim 41 wherein said vibration sensing means comprises a vibration sensor capable of detecting vibration within an x, y and/or z plane and adapted, upon detecting such vibration, to send a signal to a receiver capable of converting said signal into an audible or visual record of the vibration within said housing and/or producing an audible or visual alarm if the vibration reaches a preselected level, and wherein said sensing fitting has a connecting end and a receiving end, said connecting end being sized and configured to be fixedly yet detachably received by said aperture.

50. A method of monitoring bearing performance in apparatus having at least one threaded aperture sized and disposed to connectably receive a grease fitting for providing lubricant to said bearing, said method comprising placing in said aperture a sensing fitting sized, threaded and configured to be threadably received in said aperture, said sensing fitting including a connecting end which defines a grease path and which is sized and configured to be fixedly yet detachably received by said aperture so that, when installed in said aperture, said connecting end is proximate to said bearing, and detecting a change in bearing temperature by providing temperature sensing means to enable detection of impending bearing failure, a portion of said temperature sensing means extending into and along the length of said connecting end.

51. A method according to claim 50 wherein said temperature sensing means comprises a thermistor temperature detector which undergoes a change in resistance in response to a change in temperature within said apparatus and is adapted to send a signal to a receiver capable of converting said signal into an audible or visual record of the temperature within said apparatus and/or producing an audible or visual alarm if the temperature reaches a preselected level, and wherein said sensing fitting is in addition a grease fitting for providing lubricant to said bearing, said sensing fitting including a grease inlet nipple, a grease path and a closure, which closure remains closed at all times when the internal pressure applied to said closure exceeds the external pressure applied to said closure, said closure thereby preventing lubricant from leaking out from said apparatus and through said nipple.

52. A method according to claim 50 wherein said temperature sensing means comprises a thermistor temperature detector which undergoes a change in resistance in response to a change in temperature within said apparatus and is adapted to send a signal to a receiver capable of converting said signal into an audible or visual record of the temperature within said apparatus and/or producing an audible or visual alarm if the temperature reaches a preselected level, and wherein said sensing fitting further includes a receiving end, and wherein said sensing fitting has an axial bore along its longitudinal axis for providing a grease path, the portion of said bore proximate to said receiving end being sized and configured to fixedly yet detachably receive a grease fitting.

53. A method according to claim 50 wherein said temperature sensing means comprises a thermocouple sensing element which undergoes a change in current in response to a change in temperature within said apparatus and is adapted to send a signal to a receiver capable of converting said signal into an audible or visual record of the temperature within said apparatus and/or producing an audible or visual alarm if the temperature reaches a preselected level, and wherein said sensing fitting is in addition a grease fitting for providing lubricant to said bearing, said sensing fitting including a grease inlet nipple, a grease path and a closure, which closure remains closed at all times when the internal pressure applied to said closure exceeds the external pressure applied to said closure, said closure thereby preventing lubricant from leaking out from said apparatus and through said nipple.

54. A method according to claim 50 wherein said temperature sensing means comprises a thermocouple sensing element which undergoes a change in current in response to a change in temperature within said apparatus and is adapted to send a signal to a receiver capable of converting said signal into an audible or visual record of the temperature within said apparatus and/or producing an audible or visual alarm if the temperature reaches a preselected level, and wherein said sensing fitting further includes a receiving end, and wherein said sensing fitting has an axial bore along its longitudinal axis for providing a grease path, the portion of said bore proximate to said receiving end being sized and configured to fixedly yet detachably receive a grease fitting.

55. A method of monitoring bearing performance in apparatus having at least one threaded aperture sized and disposed to connectably receive a grease fitting for providing lubricant to said bearing, said method comprising placing in said aperture a sensing fitting sized, threaded and configured to be threadably received in said aperture, said sensing fitting including a connecting end which is sized and configured to be fixedly yet detachably received by said aperture so that, when installed in said aperture, said connecting end is proximate to said bearing, and detecting a change in the amount of bearing vibration by providing vibration sensing means to enable detection of impending bearing failure, said sensing fitting being threadably adjustably extendable into said apparatus to permit control of the proximity of said sensing fitting and said sensing means to said bearing, and wherein said sensing fitting is in addition a grease fitting for providing lubricant to said bearing, said sensing fitting including a grease inlet nipple. a grease path and a closure, which closure remains closed at all times when the internal pressure applied to said closure exceeds the external pressure applied to said closure, said closure thereby preventing lubricant from leaking out from said apparatus and through said nipple.

56. A method according to claim 55 wherein said vibration sensing means comprises a vibration sensor capable of detecting vibration within an x, y and/or z plane and adapted, upon detecting such vibration, to send a signal to a receiver capable of converting said signal into an audible or visual record of the vibration within said apparatus and/or producing an audible or visual alarm if the vibration reaches a preselected level.

57. A method according to claim 55 wherein said sensing fitting also includes temperature sensing means to enable detection of impending bearing failure.

58. A method according to claim 57 wherein said temperature sensing means comprises a thermistor temperature detector which undergoes a change in resistance in response to a change in temperature within said apparatus and is adapted to send a signal to a receiver capable of converting said signal into an audible or visual record of the temperature within said apparatus and/or producing an audible or visual alarm if the temperature reaches a preselected level.

59. A method according to claim 58, wherein said vibration sensing means comprises a vibration sensor capable of detecting vibration within an x, y and/or z plane and adapted, upon detecting such vibration, to send a signal to a receiver capable of converting said signal into an audible or visual record of the vibration within said apparatus and/or producing an audible or visual alarm if the vibration reaches a preselected level.

60. A method according to claim 57 wherein said temperature sensing means comprises a thermocouple sensing element which undergoes a change in current in response to a change in temperature within said apparatus and is adapted to send a signal to a receiver capable of converting said signal into an audible or visual record of the temperature within said apparatus and/or producing an audible or visual alarm if the temperature reaches a preselected level.

61. A method according to claim 60, wherein said vibration sensing means comprises a vibration sensor capable of detecting vibration within an x, y and/or z plane and adapted, upon detecting such vibration, to send a signal to a receiver capable of converting said signal into an audible or visual record of the vibration within said apparatus and/or producing an audible or visual alarm if the vibration reaches a preselected level.

62. A method according to claim 57, wherein said vibration sensing means comprises a vibration sensor capable of detecting vibration within an x, y and/or z plane and adapted, upon detecting such vibration, to send a signal to a receiver capable of converting said signal into an audible or visual record of the vibration within said apparatus and/or producing an audible or visual alarm if the vibration reaches a preselected level.

* * * * *

UNITED STATES PATENT AND TRADEMARK OFFICE
CERTIFICATE OF CORRECTION

PATENT NO. : 6,271,761 B1  
DATED : August 7, 2001  
INVENTOR(S) : Charles C. Smith, Thomas R. Bernard Page 1 of 1

It is certified that error appears in the above-identified patent and that said Letters Patent is hereby corrected as shown below:

Column 8, claim 9,
Line 18, the word "comprise" should be -- comprises --.

Column 10, claim 33,
Line 25, the word "impleding" should be -- impending --.
Line 26, the word " meanst" should be -- means --.

Column 11, claim 38,
Line 35, the second occurrence of "said closure," should have no comma, so as to read -- said closure --.

Signed and Sealed this

Twenty-sixth Day of February, 2002

Attest:

Attesting Officer

JAMES E. ROGAN
Director of the United States Patent and Trademark Office